March 21, 1933.    J. N. REYNOLDS ET AL    1,902,292
ACCELERATING FEED ROLL
Filed March 5, 1929
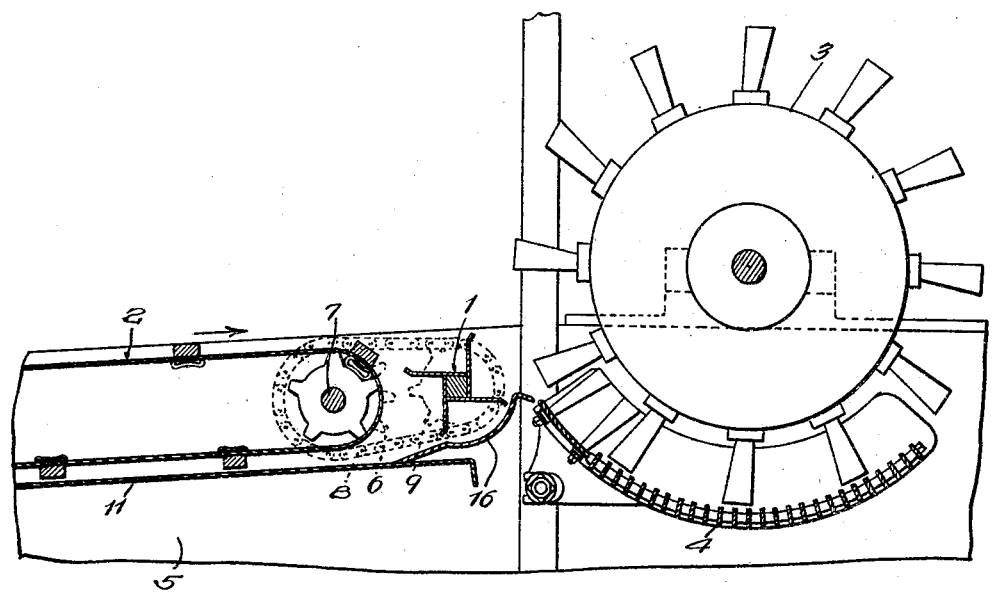
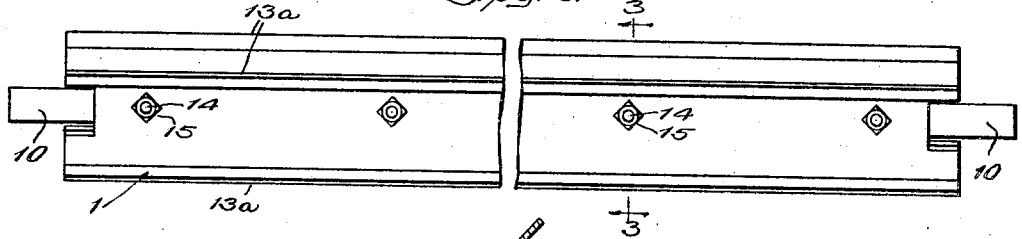
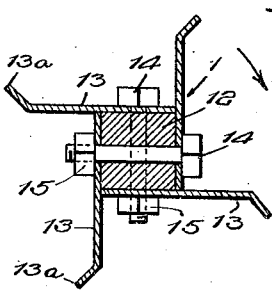
Inventors
James N. Reynolds
Charles J. Scranton Jr.

Patented Mar. 21, 1933

1,902,292

UNITED STATES PATENT OFFICE

JAMES N. REYNOLDS AND CHARLES J. SCRANTON, JR., OF PEORIA, ILLINOIS, ASSIGNORS TO AVERY POWER MACHINERY CO., OF PEORIA, ILLINOIS, A CORPORATION OF ILLINOIS

ACCELERATING FEED ROLL

Application filed March 5, 1929. Serial No. 344,371.

This invention relates to combined harvesting and threshing machines, commonly termed "combines", and has to do more particularly with the means for feeding the harvested grain to the cylinder and concave.

It is the common practice in combines to deliver the harvested grain from the platform or header elevator to the cylinder and concave by means of a conveyor in the feed house, this conveyor being commonly in the form of an endless chain or belt with cross slats. The feed conveyor, in accordance with the present practice, makes its turn back as close to the cylinder as possible. The lower run of this conveyor travels back on a closed bottom, this being necessary to keep the grain kernels from falling through and being lost, and constantly carries with it straw and grain which is not pulled off and taken in by the cylinder.

It frequently happens that this carrying around or feeding back of the harvested grain reaches a point where the lower run of the conveyor wedges and breakage thereof results, the chain and slats of the conveyor being then drawn in by the cylinder teeth with disastrous results to the machine as well as to the conveyor. A further objection to positioning the feed conveyor in the manner described, under present practice, is that occasionally the cylinder teeth will hook into the chain of the conveyor causing breakage thereof and drawing the conveyor against the concave teeth with resulting serious damage.

We have found that by providing a suitable supplemental feed device between the feed conveyor and the cylinder and concave, the harvested grain can be effectively removed from the feed conveyor and delivered to the cylinder and concave in such manner as to prevent binding of the lower run of the conveyor and consequent breakage thereof. The provision of this supplemental feed device also eliminates the possibility of the cylinder teeth hooking into the chain of the conveyor and causing breakage thereof. One of the main objects of our invention is to provide an accelerating roll or feed device between the feed conveyor and the cylinder and concave, such roll serving to remove the harvested grain from the feed conveyor and discharge it into the intake of the cylinder and concave. In its broader aspects, our invention comprehends the provision of any suitable means suitably located to transfer the harvested grain from the feed conveyor to the cylinder and concave in such manner as to eliminate back feeding and consequent jamming and breaking of the conveyor.

More specifically, this means is disposed between the feed conveyor and the cylinder and concave so as to space the conveyor away from the cylinder instead of having it disposed closely adjacent the cylinder as in the present construction commonly employed. A further object of our invention is to provide a feed roll or equivalent means having projecting elements disposed and adapted to remove the harvested grain from the conveyor and deliver it to the cylinder and concave. Further objects and advantages of our invention will appear from the detailed description.

In the drawing:

Fig. 1 is a fragmentary sectional view through the feed house and cylinder and concave, and associated parts, of a combine illustrating our accelerating feed roll as applied, parts being shown in elevation and the concave being illustrated more or less diagrammatically;

Fig. 2 is a plan view of the roll;

Fig. 3 is a section taken substantially on line 3—3 of Fig. 2.

We have illustrated our invention, by way of example, as comprising a feed roll 1 disposed between a feed conveyor 2 and a cylinder and concave 3 and 4, respectively, of a combine. The conveyor 2 is disposed in a feed house 5 and comprises chains and connecting cross slats. The feed conveyor, as well as the feed house and the cylinder and concave and associated parts are of known construction and need not be illustrated nor described in detail.

A sprocket wheel 6 is secured on one end of shaft 7 at the delivery end of the feed conveyor 2. This sprocket wheel is connected by a sprocket chain 8 to a sprocket wheel 9 secured on a shaft 10 at one end of the body of roll 1. Shaft 10 is adapted for mounting in suitable journals whereby the roll is supported for rotation transversely of the feed house 5. Shaft 7 of the conveyor 2 is driven in a suitable manner, as by chain and sprocket means, from a second driven shaft of the machine, such as the shaft for reciprocating the cutter bar, as is well known in the art. The chain and sprocket connection between shaft 7 and the feed roll 1 serves to drive the feed roll in the same direction as and at higher speed than the feed conveyor 2. The lower run of this conveyor travels back on a closed bottom 11. In combines of present construction such as are in common use, the feed conveyor 2 is disposed closely adjacent the cylinder 3 so as to deliver the harvested grain to the cylinder and concave. As above pointed out, with this arrangement a certain amount of the harvested grain is fed back along the closed bottom 11 and eventually causes binding or jamming of the conveyor with resulting breakage thereof, in some cases the broken conveyor being then drawn against the concave teeth by the cylinder teeth causing serious damage. When this does not occur, there is always the possibility of the cylinder teeth hooking into the conveyor and causing breakage thereof with resulting serious damage to the machine as well as to the conveyor.

The accelerating feed roll 1 is preferably provided with a body 12 of polygonal cross section. We have illustrated this body as being square in cross section though any other suitable or preferred form of body may be employed. A flat wing member 13, which may conveniently be formed of sheet metal, seats upon each face of body 12 and projects outwardly an appreciable distance beyond the body. These wing members are suitably secured to the body, a convenient manner of accomplishing this being to insert bolts 14 through the body and through the wing members at the opposite faces thereof, nuts 15 being screwed onto these bolts. Any other suitable or preferred means may be employed for securing the wing members to the body. As will be noted more clearly from Figure 3, the outer terminal portion 13a of each of the wing members is preferably disposed at an angle to the body thereof, these terminal portions being all similarly disposed and bent in the direction of rotation of the roll, as will be clear from Figure 1. Preferably a suitable closure member 16 extends about the lower portion of feed roll 1 and between the concave 4 and the inner portion of closed bottom 11, this member being conveniently formed of sheet metal.

During operation of the combine, the cut grain discharged onto the upper run of feed conveyor 2 from the platform or header conveyor, is moved inwardly toward the cylinder and concave as indicated by the arrow in Figure 1. At the turn back or discharge end of the conveyor, the cut grain, including both the heads and the straw, is removed from the conveyor by the wing members 13 and is discharged thereby and delivered to the cylinder and concave. The removal of the cut grain from the conveyor is facilitated by centrifugal action, the conveyor, where it turns back, acting to project or discharge the grain onto the roll 1.

The angularily disposed terminal elements 13a of the wing members 13 are disposed at an upward inclination as they engage the harvested grain to remove it from the discharge end of the conveyor 2, which is of material assistance in the proper removal of the grain from the feed conveyor, these elements being also of value in assuring proper delivery of the grain downwardly to the cylinder and concave. This removal and delivery of the harvested grain is facilitated by driving the accelerating feed roll 1 at higher speed than the feed conveyor 2. This assures that the harvested grain is removed from the conveyor at the discharge end thereof and effectively prevents the objectionable back feeding previously referred to. Also, by disposing the accelerating feed roll between the feed conveyor 2 and the cylinder, we eliminate all possibility of the cylinder teeth hooking into the conveyor chain. We thus avoid the objections above noted to the means at present employed in combines of common construction for delivering the harvested grain to the cylinder and concave.

As previously noted, our invention, in its broader aspects, comprehends the provision of any suitable means for delivering the harvested grain to the cylinder and concave from the feed conveyor in such manner as to eliminate possibility of jamming thereof due to back feeding while rendering it possible to dispose this conveyor remote from the cylinder. This, we believe to be broadly new and our invention is not to be limited to the particular means illustrated for accomplishing the stated purposes, this means being shown simply by way of example.

What we claim is:

1. In combination in a combined harvesting and threshing machine, a cylinder and concave, a feed house having a closed bottom, a feed conveyor for the cut grain and operating in said house, the lower run of the conveyor operating in proximity to the bottom wall of the feed house, and a feed roll disposed to receive the cut grain from the discharge end of the conveyor and deliver it to the cylinder and concave, said roll comprising wing members projecting approximately radially therefrom, said wing members being continuous and unbroken at their outer edges, the roll being driven at higher speed than the conveyor and the wing members acting to prevent entry of the cut grain between the lower run of the conveyor and the bottom of the feed house.

2. In combination in a combined harvesting and threshing machine, a cylinder and concave, a feed conveyor, and an accelerating feed roll disposed substantially in the plane of the conveyor and to directly receive the cut grain delivered therefrom, said roll being in close proximity to the cylinder and concave and acting to deliver the cut grain directly to said cylinder and concave, and means for driving the accelerating feed roll in the same direction as and at higher speed than the conveyor, the roll comprising wing members projecting approximately radially therefrom and continuous and unbroken at their outer edges.

In witness whereof, we hereunto subscribe our names this 23 day of February 1929.

JAMES N. REYNOLDS.
CHARLES J. SCRANTON, Jr.